United States Patent [19]

Choung

[11] 4,281,037
[45] Jul. 28, 1981

[54] CLEANING AND PRIMING COMPOSITION CONTAINING TITANIUM ACETYLACETONATE AND METHOD

[75] Inventor: Hun R. Choung, Dayton, Ohio
[73] Assignee: DAP, Inc., Tipp City, Ohio
[21] Appl. No.: 176,385
[22] Filed: Aug. 8, 1980
[51] Int. Cl.$^3$ ........................... C11D 7/50; B05D 3/10
[52] U.S. Cl. ............................... 427/407.3; 106/14.13; 106/287.19; 252/90; 252/91; 252/171; 427/409; 427/418; 427/419.2; 427/419.5; 427/419.8; 428/425.9; 428/470
[58] Field of Search ........................... 252/171, 90, 91; 106/287.19, 14.13; 15/104.93; 427/407.3, 409, 417, 418, 419.2, 419.5, 419.8; 428/425.9, 470, 539

[56] References Cited
U.S. PATENT DOCUMENTS
3,002,854  10/1961  Brill .

FOREIGN PATENT DOCUMENTS
54-47715  4/1979  Japan .

OTHER PUBLICATIONS

Information Bulletin, DuPont Industrial Chemicals, "TYZOR"AA Organic Titanate, (second formula on p. 3).
DuPont Bulletin, "Organic Titanates as Primers for Extruded Polyethylene Films", (formulas on bottom of p. 1).
InstructionsCopied From (1) Rust-Oleum Rust Inhibitive Primer, (2) Post Latex Primer and Sealer.

*Primary Examiner*—Harris A. Pitlick
*Attorney, Agent, or Firm*—Warrick E. Lee, Jr.; Vincent H. Gifford; Bruce M. Eisen

[57] ABSTRACT

Compositions for cleaning and priming a surface comprising a solution of titanium acetylacetonate; alkanol having 1 to 4 carbon atoms; alkanol selected from methylethylkeytone, methylisobutylketone, acetone and their mixture; and water.

The compositions, which perform both cleaning and priming in a one-step operation, cure quickly allowing rapid painting.

16 Claims, No Drawings

CLEANING AND PRIMING COMPOSITION CONTAINING TITANIUM ACETYLACETONATE AND METHOD

BACKGROUND

This invention relates to a stable composition for quickly and effectively cleaning and priming a surface prior to applying paint or other coating, or to laminating a different surface to the primed surface.

It was believed, in the art that a two-step operation was necessary, since applying a priming composition to an uncleaned surface was considered unacceptable. See, for example, the instruction on label of Rust-Oleum ®Rust-Inhibiting Primer. First the surface was cleaned with detergent and/or solvent. After cleaning, the surface was primed with a composition such as Rust-Oleum ®Rust-Inhibiting primer, or that disclosed in U.S. Pat. No. 3,002,854 (Brill). Such conventional primers may require from several minutes up to several hours to cure at room temperature.

SUMMARY OF THE INVENTION

The present invention provides a composition and method for cleaning and priming a surface in one step, thereby saving considerable labor over the standard two-step procedure. Furthermore, compositions of the present invention cure more quickly, allowing rapid painting of the primed surface without the long wait required by prior priming compositions. Additionally, the composition are surprisingly more stable than those of the prior art.

One aspect of the invention is a cleaning and priming composition comprising a solution of (a) 0.1 to 10 weight percent titanium acetylacetonate, (b) 20 to 50 weight percent alkanol having 1 to 4 carbon atoms, (c) 20 to 50 weight percent selected alkanone, and (d) 5 to 40 weight percent water. All percentages used herein are weight percents based on total weight unless otherwise stated.

A second aspect of the invention is a method for cleaning and priming a surface using the compositions.

DETAILED DESCRIPTION OF THE INVENTION

The four necessary ingredients of the cleaning and priming compositions are titanium acetylacetonate, alkanol having 1 to 4 carbon atoms, selected alkanone, and water.

Titanium acetylacetonate is sold in solution with about 25 percent isopropanol under the tradename "TYZOR AA" by du Pont. The manufacture of titanium acetylacetonate is described in U.S. Pat. No. 3,002,854. (Brill).

Preferred alkanols having 1 to 4 carbon atoms are methanol, ethanol, propanol and isopropanol. Isopropanol is most preferred.

The alkanones are selected from the group consisting of methylethylketone (MEK), methylisobutylketone (MIBK), acetone, and mixtures thereof. MEK is most preferred.

Ordinary water may be used in the compositions. However in some localities impurities such as iron or cetain other hard metallic ions make it preferable to use water that has been deonized, distilled or otherwise purified.

The operable and preferred amounts of each ingredient of the composition are given in the following table.

| Ingredient | Operable Range | Preferred |
|---|---|---|
| Titanium Acetylacetonate | 0.1–10% | 0.5–3% |
| Alkanol | 20–50% | 25–45% |
| Alkanone | 20–50% | 25–40% |
| Water | 5–40% | 10–35% |

The most preferred composition contains about 1 percent titanium acetylacetonate, about 39 percent isopropanol, about 30 percent methylethyl ketone, and about 30 percent water.

Although not necessary for operability, 0.1 to 0.5 percent of a perfume may be added to the composition to mask the odor of the alkanone and/or alcohol. Other acceptable additives would be dye to improve visability during application and corrosion inhibitor, such as magnesium chromate.

Preferred compositions of the present invention were found to have better shelf life in closed containers than a prior-art art primer. Furthermore, in open containers, the preferred compositions lasted longer than the same prior-art composition.

It has been surprisingly found that even greater shelf life in closed containers may be attained if the compositions are prepared and stored in two parts. The following manufacturing procedure may be used.

| | Ingredient | Weight Percent Range | Preferred Weight Percent |
|---|---|---|---|
| PART A | Titanium Acetylacetonate | 1–50 | 10 |
| | Isopropyl Alcohol | 20–50 | 30 |
| | MEK | 20–50 | 30 |
| | Water | 10–40 | 30 |
| PART B | Isopropanol | 20–50 | 40 |
| | MEK | 20–50 | 30 |
| | Water | 20–50 | 30 |

Procedure:
 PART A.
  (a) Add Titanium Acetylacetonate to mixture of MEK to isopropanol and mix well.
  (b) Add water to the above mixture slow enough to maintain a clear solution.
 PART B.
  Mix ingredients in any order.
To Prepare Composition:
 Add 10 parts of Part A concentrate to 90 parts of Part B and mix well to uniformity.

Of course the concentrate and diluting solutions may be prepared using alternate ingredients and mixed together in any proportion that yields a solution having concentrations within the operable range of the invention.

The cleaning and priming composition can be applied to wood, metal, plastic, insulating board and wallboard surfaces which may be finished or unfinished. The method of using the composition will be dependent on the surface to be worked. Contemplated modes of application would include applying the solution with a cloth, brush, pre-impregnated pad, pump spray, aerosol spray, or using a dipping tank. After application and the composition, the surface should be rubbed with an absorbant material such as a sponge, newspaper, cloth, etc. to remove dirt, grease, oil, and the like. As with prior art cleaners, more than one application may be necessary for particularly dirty surfaces. But unlike the prior art, the present-composition require no second step. A thin layer of the inventive composition is simply allowed to cure on the surface. After a brief cure, which takes only a few minutes, the surface is ready for the application of paint, sealer, adhesive, or the like. The prior art would require a second step involving drying the cleaner, applying a primer, and curing, which could take several hours.

A preimpregnated pad may be prepared by soaking a pad (such as that made under the trade name KIMTEX by Kimberly-Clark Corp.) with the composition so that the pad contains 4.5 to 5 times its dry weight of cleaning and priming composition. A metallic aerosol spray can, which should also contain about 30 to 50 parts by weight propellent per 100 parts cleaning and priming composition, should be lined with plastic to prevent rusting by the water in the composition.

Keeping in mind the ease of application and short cure time, use of the composition is envisioned in the aircraft and automotive industries where the cleaning and priming of metal surfaces is a primary factor before the application of finishing coats. The compositions have been found particularly effective for priming aluminum, fiberglass, and ceramic for painting with polyurethane or oil based paint. Use at the composition on aircraft or automobiles is comtemplated. Further, the compositions would be useful in the home building, insulating, glass, boat, and "do-it-yourself" industries.

It is contemplated that 1 gallon of the composition will clean and prime a surface area of about 250 to 300 square feet.

EXAMPLES

A composition in accordance with the following table was prepared.

| Ingredient | |
|---|---|
| Tyzor AA | 1% |
| Isopropanol | 39% |
| MEK | 30% |
| Water | 30% |
| | 100% |

CURING TIME TESTS

A bare aluminum surface, initially having a thin coat of oil was cleaned and primed with the above composition by rubbing and allowing a thin coat to remain on the surface. After application, a sheet of 1/36" thick double face polyethylene foam pressure sensitive tape was firmly pressed to the surfaces and then peeled from the surfaces at various times after application. An adhesive failure (AF) indicates that the composition failed to adhere to the aluminum surface, i.e. it had not cured yet. A coehesive failure (CF) indicates that the composition adhered to the surface and that failure occurred within the composition itself, i.e., the composition had cured.

The results of these tests are listed in the following table:

| Time (min) | 65° F./35% RH | 72° F./65% RH |
|---|---|---|
| 1 | AF | AF |
| 2 | AF | CF |
| 3 | AF | CF |
| 4 | CF | — |
| 5 | CF | — |
| 10 | — | — |
| 30 | — | — |

As seen from the table, at 65° F./35% relative humidity, the composition of the present invention cured in about 4 minutes. Under more favorable conditions, i.e., 72° F./65% relative humidity, the composition cured in 2 minutes. Hence the composition was able to perform both cleaning and priming in one step, yet still cure very quickly.

USEFUL LIFE IN OPEN CONTAINER

When the composion was allowed to stand in an open container, no change except for evaporation of solvent was observed for 72 hours. Precipitation, which impairs the quality at the material, did not occur within that time, proving that the composition has a very long useful life in open containers, and strongly indicating a very long shelf life in closed containers.

What is claimed is:

1. A composition useful for cleaning and priming surfaces comprising a solution of:
    (a) 0.1 to 10 weight percent titanium acetylacetonate,
    (b) 20 to 50 weight percent of alkanol having 1 to 4 carbon atoms,
    (c) 20 to 50 weight percent of alkanone selected from the group consisting of methylethylkeytone, methylisobutylketone, acetone, and mixtures thereof, and,
    (d) 5 to 40 weight percent water.

2. The composition of claim 1 containing 0.5 to 3 weight percent (a), 25 to 45 weight percent (b), 25 to 40 weight percent (c), and 10 to 35 weight percent (d).

3. The composition of claim 2 wherein said alkanol is isopropanol.

4. The composition of claim 2 wherein said alkanone is methylethylketone.

5. The composition of claim 2 containing about 1 weight percent titanium acetylacetonate.

6. The composition of claim 2 wherein said alkanol is isopropanol and said alkanone is methylethylketone.

7. The composition of claim 6 wherein said weight percents of (a), (b), (c) and (d) are about 1, about 39, about 30, and about 30 respectively.

8. The composition of claim 7 further comprising 0.1 to 0.5 weight percent of a perfume.

9. An aerosol can containing about 30 to 50 parts by weight propellent and 100 parts by weight of the composition of claims 1 or 7.

10. A pad impregnated with the composition of claims 1 or 7.

11. A method of cleaning and priming a surface comprising rubbing said surface with the composition of claims 1 or 7.

12. The method of claim 11 wherein said surface comprises material selected from the group consisting of aluminum, fiberglass, or ceramic.

13. The method of claim 11 wherein said surface is an aircraft or an automobile.

14. The method of claim 12 further comprising coating the surface with a paint selected from the group consisting of polyurethane-based paint or oil-based paint.

15. A concentrate composition comprising:
(a) 1 to 50 percent titanium acetylacetonate,
(b) 20 to 50 percent alkanol having 1 to 4 carbon atoms,
(c) 20 to 50 percent alkanone selected from the group consisting of methylethylketone, methylisobutylketone, acetone or mixture thereof,
(d) 10 to 40 percent water.

16. A method for cleaning and priming a surface comprising the steps of (1) diluting the concentrate composition of claim 15 with a diluting solution comprising 20 to 50 percent alkanol having 1 to 4 carbon atoms, 20 to 50 percent alkanone selected from the group consisting of methylethylketone, methylisobutylketone, and acetone, and 20 to 50 percent water, so as to form a cleaning and priming solution having:
(a) 0.1 to 10 percent titanium acetylacetonate
(b) 20 to 50 percent alkanol
(c) 20 to 50 percent alkanone, and
(d) 5 to 40 percent water, and (2) rubbing a surface with said cleaning and priming solution.

* * * * *